(No Model.)

C. W. HUNT.
HOISTING APPARATUS.

No. 555,703. Patented Mar. 3, 1896.

Witnesses
Chas. H. Smith
J. Staib

Inventor
Charles W. Hunt
per Lemuel W. Serrell
Atty

UNITED STATES PATENT OFFICE.

CHARLES W. HUNT, OF WEST NEW BRIGHTON, NEW YORK.

HOISTING APPARATUS.

SPECIFICATION forming part of Letters Patent No. 555,703, dated March 3, 1896.

Application filed October 11, 1895. Serial No. 565,319. (No model.)

*To all whom it may concern:*

Be it known that I, CHARLES W. HUNT, a citizen of the United States, residing at West New Brighton, in the county of Richmond and State of New York, have invented an Improvement in Hoisting Apparatus, of which the following is a specification.

Friction-drums have heretofore been provided in which either the drum is loose upon the shaft or the adjacent gear-wheel, the two being connected by an annular friction-rib and groove, and an end motion has been given to the drum or to the gear to press the frictional surfaces into contact by a pin passing axially through a hole in the shaft. In the devices of this character difficulty has been experienced in lubricating the end of the pin where it is acted upon by a lever or other device, and the result has been that the surfaces quickly cut out or become heated.

The object of the present invention is to give an end motion to the shaft itself, so that the pressure of one frictional surface upon the other is obtained by acting at opposite sides of the journal box or frame, so that the parts are more easily lubricated and they can be made much larger and stronger than those heretofore employed.

Figure 1:
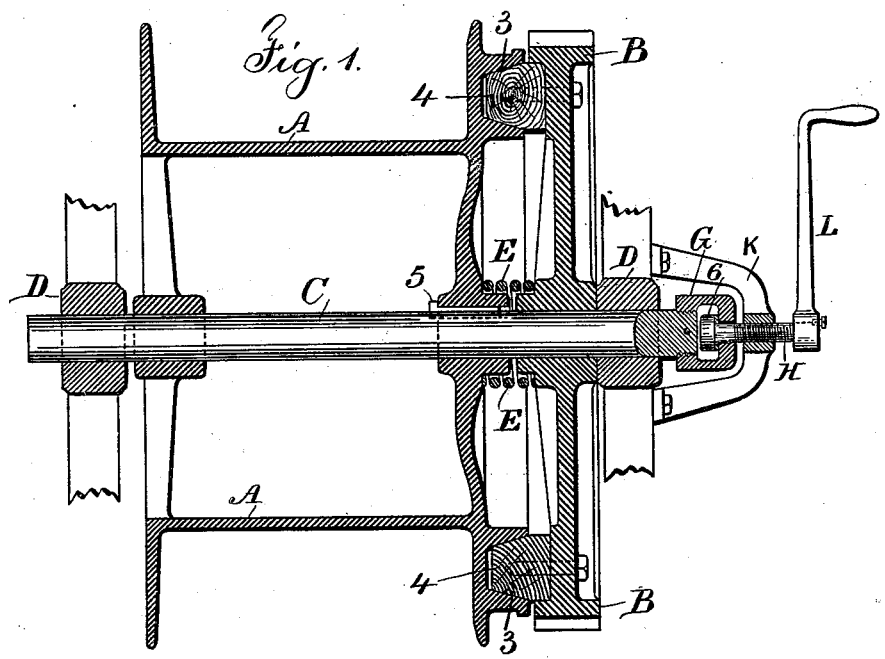
Figure 2:
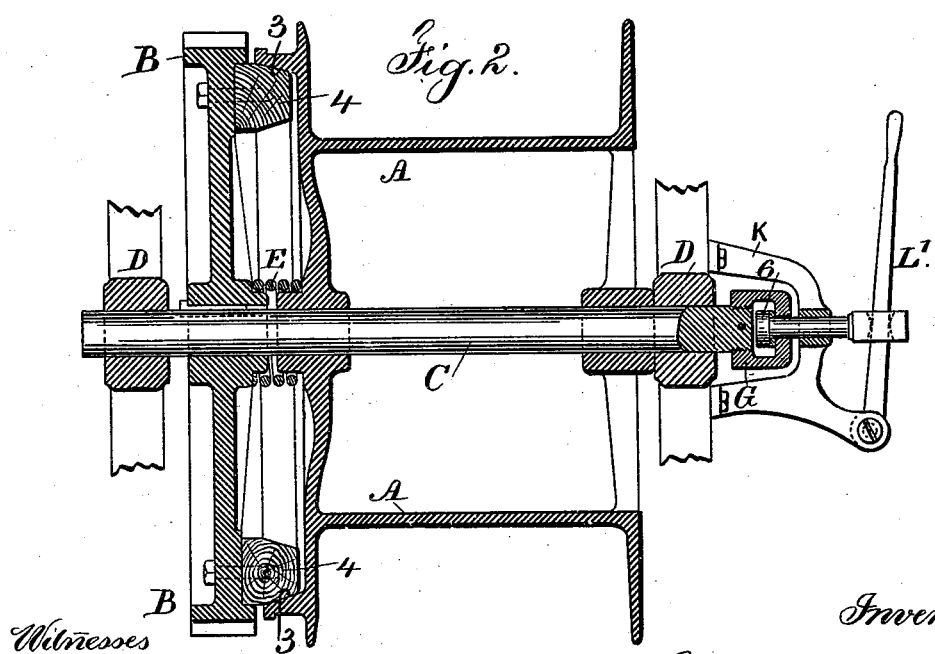

In the drawings, Figure 1 is a vertical section illustrating the present improvement, and Fig. 2 is a similar view showing the same invention with the parts transposed.

The drum A is of any desired size and character and the wheel B is to be driven by a pinion or other suitable motive power, and the annular frictional surfaces are formed by the groove 3 and rib 4. It is generally advantageous to make the groove in the metal of the drum and to make the rib upon the gear-wheel, and the rib may be either continuous of metal, or preferably in segments of wood bolted upon the wheel B, as represented; but said frictional surfaces may be flat or of any desired character.

The shaft C is represented as supported in the frame or bearing D, and the end of the shaft projects beyond the bearing. In Fig. 1 the drum A is keyed at 5 to the shaft C and the wheel B is loose upon the shaft C, and there is a helical spring E between the hubs of the drum and wheel, respectively, to tend to separate the frictional surfaces.

Upon the end of the shaft C a hollow nut G is screwed and preferably pinned to prevent the same unscrewing, and within the hollow nut is the head 6 of the screw H, and preferably there is a washer around the screw and between the head 6 and the interior surface of the hollow nut G, and this hollow nut G is preferably made with a cavity large enough to contain the desired quantity of lubricating material, which may be supplied through a hole covered with a suitable cap.

The screw H passes through the frame or yoke K, and it is provided with a crank or lever L of suitable character, by which such screw H may be rotated more or less.

The base of the yoke K sets against the side of the frame D and is advantageously bolted thereto, and it will now be apparent that when the lever or handle L is turned so as to screw the head 6 toward the bearing D the friction between the annular surfaces 3 and 4 is relieved and the gear-wheel B can rotate without revolving the drum A. If on the contrary the lever or handle L is turned in the other direction and the screw H moved, so as to draw the head 6 away from the bearing D, the shaft C is drawn endwise and the hub of the wheel B is resisted by one side of the bearing D, and the pressure of the yoke or frame K is on the other side of that bearing. Hence there is no tendency to displace any of the parts, and the friction between the surfaces 3 and 4 will cause the gear-wheel to rotate the drum, and the pressure exerted in forcing such surfaces 3 and 4 together is resisted in one direction by the side of the bearing D and in the other direction by the hollow nut G pressing against the washer and head 6 of the screw H, and in this condition the weight connected with a chain or rope around the drum A can be drawn up and the reverse movement of the handle L will relieve the friction between 3 and 4 to any desired extent, allowing the drum to rotate as the weight is lowered, and it will be noticed that the lubricating material passes to and spreads freely upon the surfaces that are pressed into contact with each other.

When the parts are arranged in the manner shown in Fig. 2, the gear-wheel B is to be keyed upon the shaft C and the drum A loose thereon, and the hub of the drum A comes at one side of the frame or bearing D, and the pressure against the same when the tension device is operated causes the frictional surfaces 3 and 4 to engage each other, and the operations are the same as before described, the relative positions of the drum and gear-wheel being transposed.

It will be apparent that a lever might take the place of the screw, as indicated in Fig. 2, the head 6 being on a smooth rod that is connected with the lever L' and which is pivoted on the yoke K. The operations of these parts are the same as those shown in Fig. 1.

I claim as my invention—

The combination with the bearings, of a shaft supported by such bearings, a drum and a driving-wheel on such shaft and one of which is permanently attached thereto, and annular frictional engaging surfaces between the wheel and drum and mechanism upon the outer side of one of the bearings acting upon the outer end of the shaft to move the shaft endwise and bring the frictional surfaces into contact by the pressure of the wheel or drum against the inner surface of the same bearing substantially as specified.

Signed by me this 8th day of October, 1895.

CHAS. W. HUNT.

Witnesses:
GEO. T. PINCKNEY,
S. T. HAVILAND.